No. 845,450. PATENTED FEB. 26, 1907.
P. DOBLER.
MANUFACTURE OF PULVERIZED MICA.
APPLICATION FILED DEC. 4, 1905.
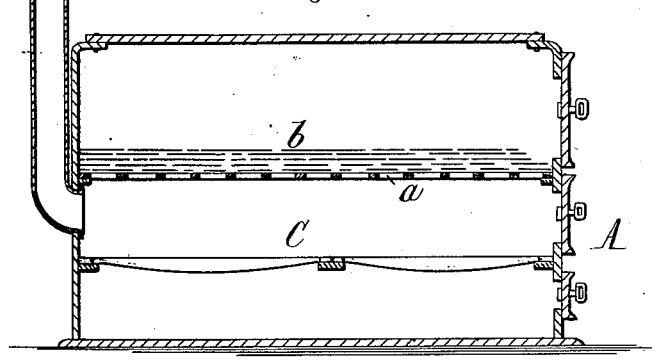
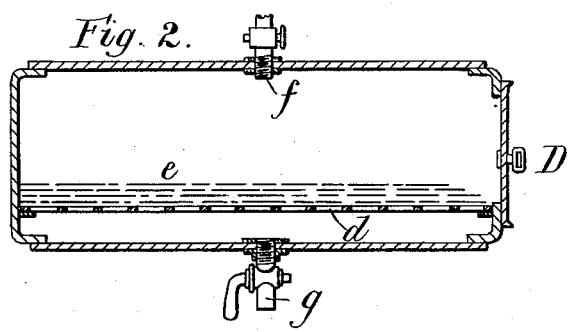
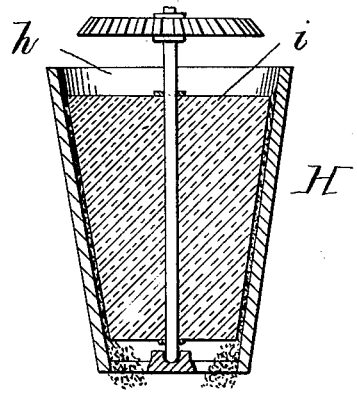

UNITED STATES PATENT OFFICE.

PHILIPP DOBLER, OF MUNICH, GERMANY, ASSIGNOR TO FRIEDRICH RICHARD TILLER, OF HAMBURG, GERMANY, AND HEINRICH DUELFER, OF CASSEL, GERMANY.

MANUFACTURE OF PULVERIZED MICA.

No. 845,450.   Specification of Letters Patent.   Patented Feb. 26, 1907.

Application filed December 4, 1905. Serial No. 290,093.

*To all whom it may concern:*

Be it known that I, PHILIPP DOBLER, a subject of the King of Bavaria, residing at Munich, Bavaria, Germany, have invented a new and useful Improvement in the Manufacture of Pulverized Mica, of which the following is a specification.

This invention has the object to reduce mica to a very fine powder, and is particularly applicable to the treatment of that kind of mica which has the form of transparent or translucent blocks, leaves, or plates.

In practicing this invention the mica is heated to a white heat for several hours, preferably for a period of from three to four hours. Transparent or translucent mica becomes opaque by this dry heating, which can be advantageously effected in an iron drum or receptacle. After the mica has become cool it is steamed for half an hour or more. For this purpose the plates or leaves of mica are preferably cut into narrow strips and then placed in a closed chamber or receptacle, to which steam or hot water is admitted. When the mica has been so steamed, it is pliable or soft and when removed from the steaming chamber or receptacle and freed from the adhering water can be reduced to a fine powder by any suitable grinding, crushing, or disintegrating machine.

The above-described method of treating mica is very simple and reduces the mica to a very fine glittering powder at comparatively small expense.

In the accompanying drawing, which represents an apparatus suitable for use in practicing this process, Figure 1 is a sectional elevation of the heating apparatus. Fig. 2 is a sectional elevation of the steaming apparatus. Fig. 3 is a sectional elevation of the grinding apparatus.

Like letters of reference refer to like parts in the several figures.

A represents the apparatus in which the mica is heated and which is provided with a perforated support or grate $a$, upon which the mica is placed, as indicated at $b$, and with a fire-chamber C below said perforated support.

D represents the apparatus in which the mica is steamed and which is provided with a perforated support or grate $d$, upon which the mica is placed, as indicated at $e$, and with an inlet-pipe $f$ for the steam or hot water and a drain-pipe $g$.

H represents the apparatus in which the mica is ground and which comprises a grinding-shell $h$ and a cone $i$.

The above-described apparatus for heating, steaming, and grinding the mica is, however, shown only as illustrating the apparatus in a general way, and other suitable apparatus may be substituted without departing from this invention.

I claim as my invention—

The herein-described method of reducing mica to a powder which consists in subjecting mica to a high degree of dry heat, then steaming the mica, and finally pulverizing the same, substantially as set forth.

Witness my hand this 4th day of November, 1905.

PHILIPP DOBLER.

Witnesses:
 ULYSSES J. BYWATER,
 GEORG KÖRNER.